United States Patent [19]
Bottenbruch et al.

[11] 3,726,945
[45] Apr. 10, 1973

[54] HOMOGENEOUS MIXTURES OF POLYAMIDES AND HYDROXYL-CONTAINING POLYOLEFINES

[75] Inventors: Ludwig Bottenbruch; Dietrich Michael; Werner Nielinger, all of Krefeld Bockum, Germany

[73] Assignee: Farbenfabriken Bayer AG, Krefeld-Bockum, Germany

[22] Filed: Feb. 11, 1972

[21] Appl. No.: 225,619

Related U.S. Application Data

[63] Continuation-in-part of Ser. No. 28,562, April 14, 1970, abandoned.

[52] U.S. Cl................................260/857 L, 260/78 R
[51] Int. Cl. ............................................C08g 41/04
[58] Field of Search ....................................260/857 L

[56] References Cited

UNITED STATES PATENTS

| | | | |
|---|---|---|---|
| 2,473,403 | 6/1949 | Woodward | 260/857 |
| 3,454,512 | 7/1969 | Ahmed | 260/857 |
| 3,313,789 | 4/1967 | Naarman | 260/857 |
| 3,529,924 | 9/1970 | Maloney | 260/857 |
| 3,636,136 | 1/1972 | Konopik | 260/857 L |

FOREIGN PATENTS OR APPLICATIONS

| | | | |
|---|---|---|---|
| 1,127,479 | 9/1968 | Great Britain | 260/857 |
| 44/24,277 | 10/1969 | Japan | 260/847 |
| 465,337 | 5/1950 | Canada | 260/857 |

*Primary Examiner*—Paul Lieberman
*Attorney*—Allan R. Plumley et al.

[57] ABSTRACT

The invention relates to homogeneous injection mouldable compositions which comprise 70 to 99.9 percent by weight of a polyamide and 0.1 to 30 percent by weight of a hydroxyl-containing polyolefine. Saponified copolymers of ethylene and vinyl acetate are suitable for use as hydroxyl-containing polyolefines.

5 Claims, No Drawings

HOMOGENEOUS MIXTURES OF POLYAMIDES AND HYDROXYL-CONTAINING POLYOLEFINES

This is a continuation-in-part of copending U.S. patent application Ser. No. 28,562, filed Apr. 14, 1970 now abandoned.

The present invention relates to new homogeneous suitable for injection moulding mixtures of polyamides and hydroxyl-containing polyolefines and to a process for their preparation.

Polyamides such as polycaprolactam are distinguished by their high tensile strength, toughness and rigidity. However, their reduced flexibility at low temperatures is sometimes a disadvantage.

Attempts have been made to obtain polyamides which are more flexible at low temperatures by mixing polyamides with polymers which have a very low freezing point. The properties of such mixtures, for example of mixtures of polyamide and polyethylene, are not very satisfactory because the polyamides are incompatible with other polymers and these polymers are therefore difficult to disperse in the polyamide.

The dispersibility of polyolefines in polyamides can be improved by adding dispersing agents when preparing the mixtures or by grafting polyolefine and polyamide.

It is also known that products which have an improved notched impact strength at low temperatures are obtained when polyamides contain polyamide side chains which are grafted on carboxyl-containing copolymers of ethylene.

It is an object of this invention to provide polyamides with an improved flexibility at low temperatures.

This object is accomplished by compositions of polyamides and hydroxyl-containing olefine copolymers which are characterized by improved flexibility at low temperatures in the same way as less crystalline types of polyamides. At the same time, they resemble the more crystalline types in their improved properties for working up, such as the ease with which they can be removed from moulds.

More particularly, the present invention relates to a homogeneous mixture of polyamides and polyolefines suitable for injection moulding which comprises
a. 70 to 99.9 percent by weight of a polyamide and
b. 0.1 to 30 percent by weight of a hydroxyl-containing polyolefine which consists of 60 to 90 percent by weight of recurrent units of the general formula

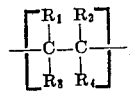

and 10 to 40 percent by weight of recurrent units of the formula:

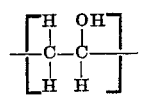

wherein $R_1$, $R_2$, $R_3$ and $R_4$, which may be the same or different, represent a hydrogen atom, a lower alkyl group or a halogen atom, the polyolefine having a molecular weight in the region of $10^4$ to $10^5$ and the homogeneous, suitable for injection moulding mixture having a relative solution viscosity of at least 2.0.

The viscosity is measured on a solution of 1 g of the mixture in 100 ml of m-cresol at 25 °C in an Ubbelohde viscosimeter.

Saponified copolymers of ethylene and vinyl acetate are particularly suitable for use as the hydroxyl-containing polyolefines. The polyolefines should contain 10 to 40 percent by weight of units of the formula

For the purpose of this invention, polyamides are understood to mean high molecular weight polyamides which can be derived from a monoaminocarboxylic acid having at least six carbon atoms or from a salt of a dicarboxylic acid and a diamine. They are prepared by hydrolytic polymerization. By way of explanation these polyamides consist of linear unbranched polymer chains containing no additional functional groups. The compound used is preferably polycaprolactam.

70 to 99.9 percent by weight of the mixture should consist of polyamide.

The modified polyamides may be prepared by hydrolytic polymerization of the aminocarboxylic acids or of their derivatives or of the salts of dicarboxylic acids and diamines in the presence of the copolymers. The copolymers may be introduced into the reaction vessel together with the polyamide-forming starting materials but is has been found to be advantageous to add the copolymers subsequently to the slightly viscous polyamide melt.

The homogeneous, suitable for injection moulding mixtures may also be obtained by intensively mixing the polyamides with the copolymers and then extruding the mixture obtained. The products are worked up into shaped articles, e.g., by injection moulding or by extrusion.

The following examples are to further illustrate the invention without limiting it.

EXAMPLE 1

ε-Caprolactam is polymerized with 9 percent by weight of ε-aminocaproic acid and 0.09 percent by weight of glacial acetic acid for 1 hour at 200 °C with stirring under a nitrogen atmosphere. The temperature is then raised to 270 °C. One hour after this temperature has been reached, 0.1, 1.0 and 5.0 percent by weight, respectively, of a saponified copolymer of ethylene and vinyl acetate having a molecular weight of 20,000 and an OH number of 255 are introduced into the slightly viscous melt. After a further 6 hours, the melt is spun as a bristle into a water bath and chopped up. The chopped material is extracted four times with water at 95 °C, each time for 3 hours, and is then dried in a vacuum drying cupboard at 100 °C for 24 hours. The granulate is shaped by injection moulding and the mechanical properties of the moulded products are then determined. The data are summarized in the table below. Number 4 is a comparison product made of pure polycaprolactam.

| Serial No. | Polyolefine content in % by weight | Relative solution viscosity η rel (1g/100 ml m-cresol at 25 °C) | Flexural stress at a given deflection kg wt/cm² at room temp. | −20°C | Elastic modulus obtained from the bending test kg wt/cm² at room temp | −20°C |
|---|---|---|---|---|---|---|
| 1 | 0.1 | 3.58 | 1160 | 1520 | 24400 | 27500 |
| 2 | 1.0 | 3.47 | 1140 | 1520 | 24500 | 27900 |
| 3 | 5.0 | 3.07 | 1000 | 1475 | 24000 | 25600 |
| 4 | 0 | 3.1 | 1190 | 1600 | 24300 | 29800 |

EXAMPLE 2

9.5 kg of polycaprolactam having a relative solution viscosity of 3.1 determined on a 1 percent solution in m-cresol at 25 °C are intensively mixed with 0.5 kg of a saponified copolymer of ethylene and vinyl acetate having a molecular weight of 20,000 and an OH number of 255.

This mixture is extruded, chopped up and shaped by injection moulding. The products are distinguished by being easily removed from the mould and by their improved flexibility at low temperatures.

We claim:

1. A homogeneous injection moldable composition of polyamides and polyolefines, which consists of a mixture of
   a. 70 to 99.9 percent by weight of a polyamdie prepared by polymerization of a monoaminocarboxylic acid having at least six carbon atoms or from a salt of a dicarboxylic acid and a diamine and
   b. 0.1 to 30 percent by weight of a hydroxyl-containing polyolefine which consists of 60 to 90 percent by weight of recurrent units of the general formula

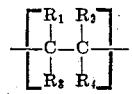

and 10 to 40 percent by weight of recurrent units of the formula

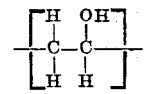

wherein $R_1$, $R_2$ and $R_4$, which may be the same or different, represent a hydrogen atom, a lower alkyl group or a halogen atom, the polyolefine having a molecular weight in the region of $10^4$ to $10^5$ and the homogeneous, suitable for injection moulding mixture having a relative solution viscosity of at least 2.0.

2. The composition as claimed in claim 1, in which the polyamide is polycaprolactam and the hydroxyl-containing polyolefine is a saponified copolymer of ethylene and vinyl acetate.

3. The homogeneous injection moldable composition as claimed in claim 1, which consists of a homogeneous melt blend of said polyamide and said polyolefine.

4. The homogeneous melt blend composition as claimed in claim 3, obtained by adding said hydroxyl-containing polyolefine to a melt of a preformed polyamide.

5. The homogeneous melt blend composition as claimed in claim 3, obtained by adding said hydroxyl-containing polyolefine to polyamide-forming starting materials.

* * * * *

UNITED STATES PATENT OFFICE
CERTIFICATE OF CORRECTION

Patent No. 3,726,945                    Dated April 10, 1973

Inventor(s) Ludwig Bottenbruch; et al

It is certified that error appears in the above-identified patent and that said Letters Patent are hereby corrected as shown below:

[73] Assignee: "Krefeld-Bockum, Germany"

should read ---Leverkusen, Germany---.

Column 3, line 33, "polyamdie" should read ---polyamide---.

Signed and sealed this 12th day of November 1974.

(SEAL)
Attest:

McCOY M. GIBSON JR.
Attesting Officer

C. MARSHALL DANN
Commissioner of Patents